Figure 16:
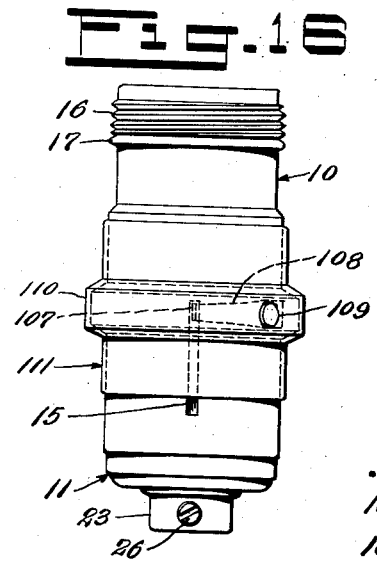

Sept. 9, 1958 R. B. LAMBERT 2,851,551
ELECTRIC LAMP SOCKET WITH SLIDABLE RING SLEEVE
Filed Feb. 5, 1957 4 Sheets-Sheet 1
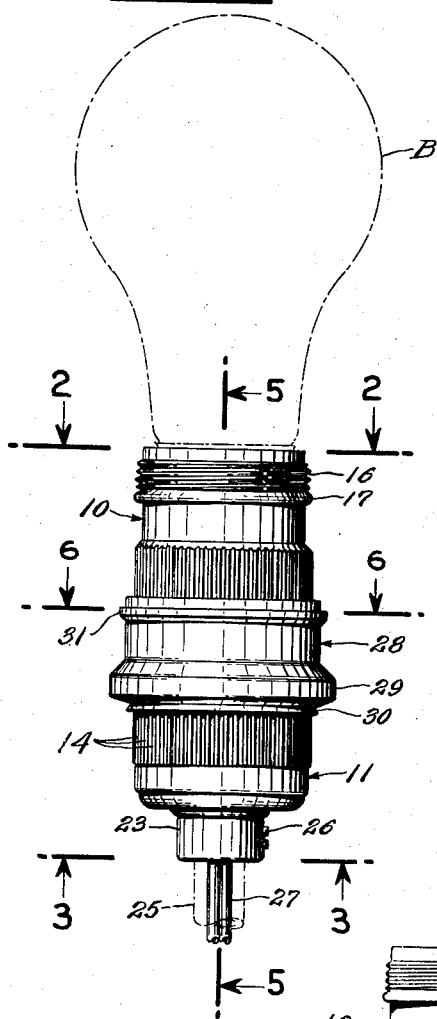
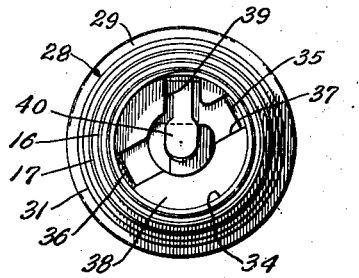
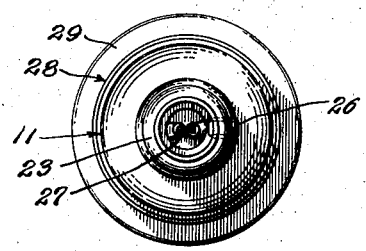
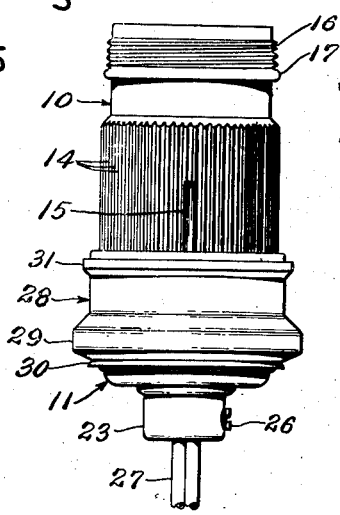
INVENTOR.
REUBEN B. LAMBERT
BY
H. G. Manning
ATTORNEY Sept. 9, 1958  R. B. LAMBERT  2,851,551
ELECTRIC LAMP SOCKET WITH SLIDABLE RING SLEEVE
Filed Feb. 5, 1957  4 Sheets-Sheet 2
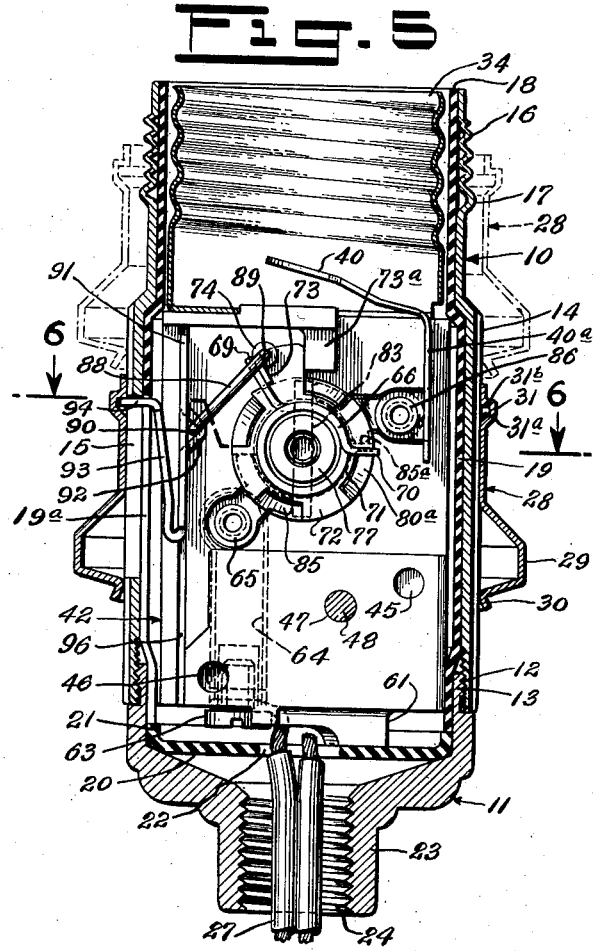
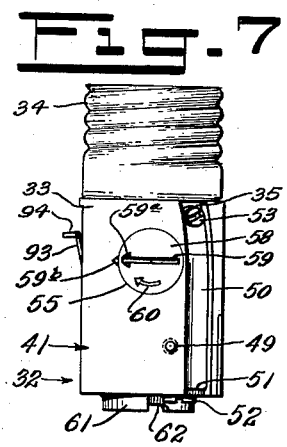
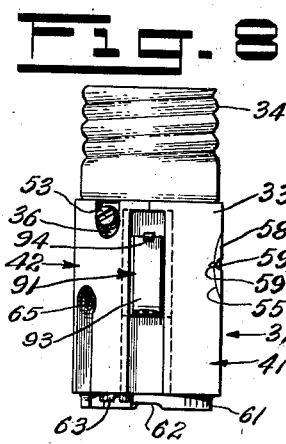
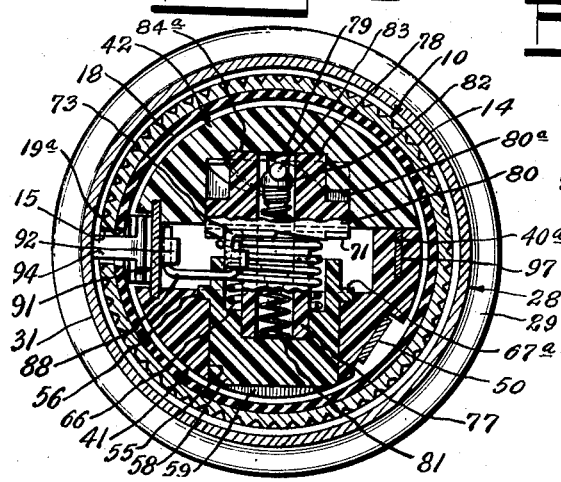
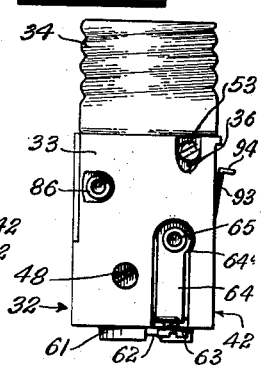
INVENTOR.
REUBEN B. LAMBERT
BY
H. G. Manning
ATTORNEY

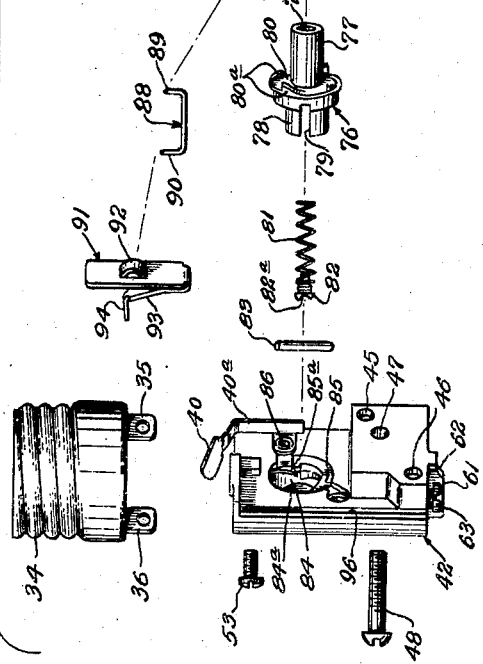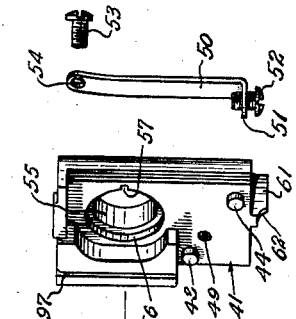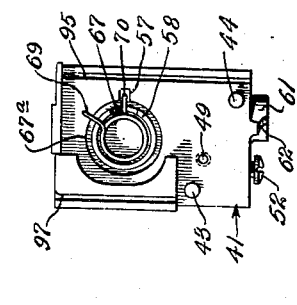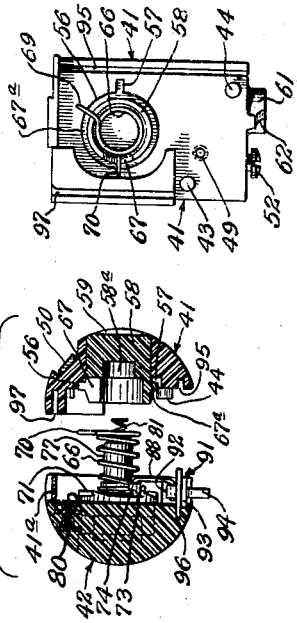

Sept. 9, 1958

R. B. LAMBERT 2,851,551

ELECTRIC LAMP SOCKET WITH SLIDABLE RING SLEEVE

Filed Feb. 5, 1957

4 Sheets-Sheet 4

INVENTOR.
REUBEN B. LAMBERT
BY
H. G. Manning
ATTORNEY

# United States Patent Office 2,851,551
Patented Sept. 9, 1958

2,851,551

ELECTRIC LAMP SOCKET WITH SLIDABLE RING SLEEVE

Reuben B. Lambert, Terryville, Conn.

Application February 5, 1957, Serial No. 638,349

19 Claims. (Cl. 200—51.14)

My invention relates to electrical switches and is directed particularly to a switch for lamp sockets and the like wherein the switch operation is effected by axial movement of a cylindrical sleeve surrounding the lamp socket.

The principal object of my invention is to provide a control mechanism for electrical switches of the above nature, whereby "on" and "off" switch control is cyclically and repeatedly effected merely by successively pressing downwardly a cylindrical sleeve member surrounding the switch body.

A more particular object of my invention is to provide a manual control mechanism for electrical switches of the above nature, in combination with a rotary, ratchet type switching mechanism, whereby switching is accomplished by applying axial presure upon a sleeve-like ring resiliently supported for axial movement about a cylindrical switch body.

Another object of my invention is to provide a switch of the character described, which can readily be actuated in the dark without fumbling for turning on a lamp or other appliance.

A further object is to provide a switch of the character described which is comprised of a minimum number of easily manufactured parts, which can readily be assembled and disassembled, and which is foolproof and long-wearing in operation.

Still another object of my invention is to provide a combination lamp socket and switch of the above nature, which is smooth in operation and attractive in appearance.

Figure 17:
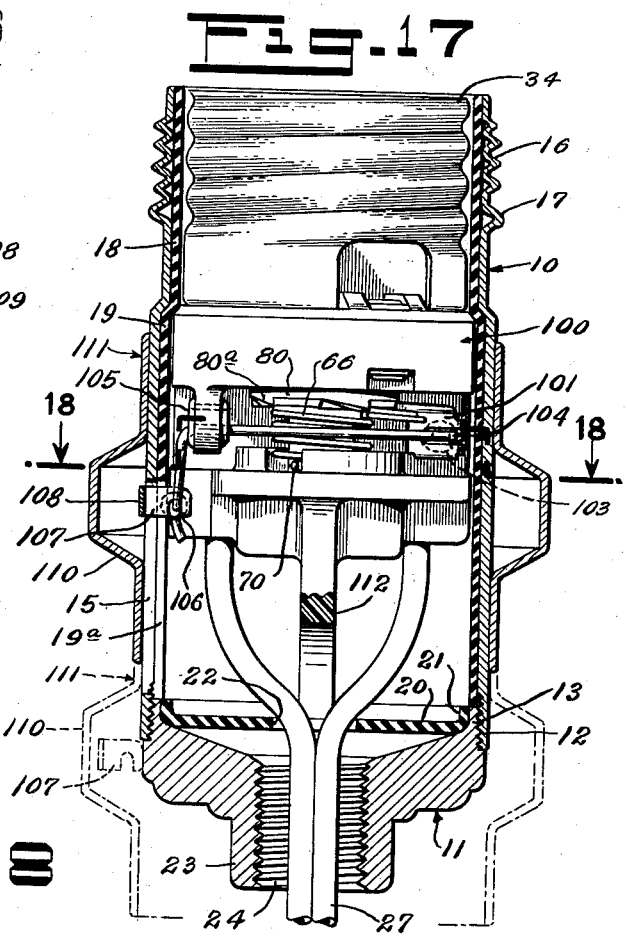
Figure 18:
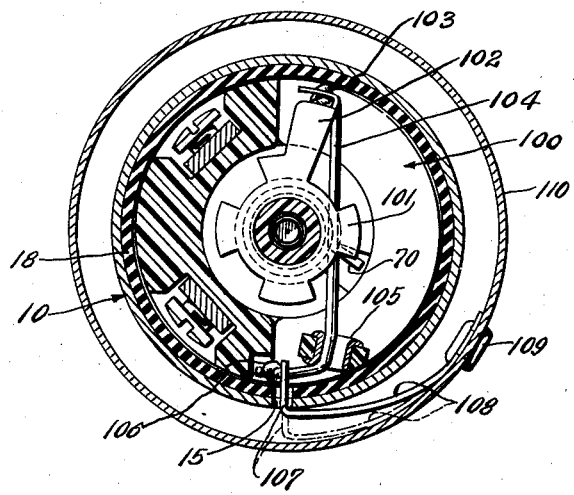

Other objects, features and advantages of my invention will be apparent from the following description when considered with reference to the appended drawings. In the drawings, which illustrate two forms in which the invention may conveniently be embodied in practice:

Fig. 1 is an elevational view of one form of a switch socket embodying the invention, Fig. 2 is a top view of the switch socket shown in Fig. 1, taken along the line 2—2 thereof, Fig. 3 is a bottom view of the switch socket shown in Fig. 1, taken along the line 3—3 thereof, Fig. 4 is an elevational view of the switch socket, similar to that of Fig. 1, but showing the switch control sleeve in its lowermost position, Fig. 5 is an elevational cross-section, on an enlarged scale, of the switch socket shown in Fig. 1, Fig. 6 is a horizontal cross-sectional view, on an enlarged scale, taken along the lines 6—6 in Fig. 1, and Fig. 5, Figs. 7, 8, and 9 are elevational views of the interior switch socket unit taken at successive 90° angles of rotation, Fig. 10 is a bottom view of the switch socket unit shown in Figs. 7–9, Fig. 11 is an exploded view of the switch socket unit shown in Figs. 7–10, illustrating its component parts, Fig. 12 is a horizontal cross-sectional view of the switch socket unit shown in Figs. 7–10, with the body sections in separated relation and illustrating the method of assembly, Figs. 13 and 14 are longitudinal inside views of one section of the interior switch socket, illustrating the spring action during assembly, Fig. 15 is a longitudinal view of the outside of the switch socket section shown in Fig. 13, and illustrating the adjusting plug in its first position prior to the completion of the assembly, Fig. 16 is an elevational view of the modified form of the switch socket, Fig. 17 is an elevational cross-section, on an enlarged scale, of the switch socket shown in Fig. 16, and Fig. 18 is a horizontal cross-sectional view, taken along the line 18—18 of Fig. 17.

Referring now in retail to the drawings, wherein like reference numerals denote corresponding parts throughout the several views, and considering first the embodiment of the invention illustrated in Figs. 1 through 15, the switch socket comprises an outer housing or shell 10 secured to an end cap 11, as by means of internal threads 12 on said shell (see Fig. 5), engaging with an externally threaded portion of decreased diameter 13 provided on said cap.

The shell 10 is formed for the greater part of its length with vertical peripheral ribs 14 and is also provided with a relatively short longitudinal narrow slot 15, through which the switch-actuating mechanism passes, as hereinbelow described. The upper or lamp end of the shell 10 is formed with the usual circumferential threads 16 and a limiting rib 17 for receiving a lamp shade or the like, not shown.

An insulation sleeve 18 having an enlarged central section 19 is fitted snugly within the shell 10. A stiff bottom insulating disc 20 is seated within the end cap 11, said disc having an upwardly-extending peripheral rim 21 which abuts the lower annular edge of the insulation sleeve 18 when the socket shell 10 and said cap are in assembled relation. The insulating disc 20 is formed with a central opening 22 in axial alignment with a reduced lower end portion 23 of the cap 11, which end portion 23 is provided with an interiorly threaded opening 24 to receive the threaded end of a standard base shaft 25 (shown in dotted lines in Fig. 1), for supporting the switch socket. A usual set screw 26 secures the cap 11 to the shaft 25.

A double electrical conductor cord 27 passes through the shaft 25, the central opening in the lower end portion 23 of the cap 11, and the opening 22 in the insulating disc 20, for connection to the interior switch socket unit.

Disposed in surrounding relation about the ribbed portion of the socket shell 10 is a sleeve-like switch ring 28 formed near its lower end with an outwardly-extending annular finger control rib 29 extending into an outwardly-flared lip 30 at the lowermost end of said ring. The ring 28 is further formed near its upper end with a relatively small outwardly-extending annular rib 31 having a lower interior inclined annular surface 31a and an upper interior right angular annular surface 31b.

The numeral 32 designates the inner socket switch unit, the same comprising generally an insulating body portion 33 and a top screw shell 34 for detachably receiving an electric lamp bulb B. The screw shell 34 has a pair of opposed depending apertured lugs 35, 36 struck out of its base 38, forming a diagonal slot 37 therein (Fig. 2). A side slot 39 communicating with the slot 37 is also cut in the base 38 to provide clearance for the passage of a center spring contact element 40 extending upwardly and inwardly from the insulating switch body 33.

The insulating switch body 33 (see Fig. 11) is comprised generally of a pair of semicylindrical body sections 41, 42 formed with respective alignment lugs 43, 44 on the section 41, and matching holes 45, 46 in the body section 42 for facilitating proper assembly. The body section 42 is provided with a recessed opening 47, through which a machine screw 48 extends for engagement in a tapped screw hole 49 in the body section 41 to hold the two sections in assembled relation.

The body section 41 is formed with a longitudinal recess, within which is disposed an electrically conductive flat bridging post 50. The lower end of the post 50 is turned inwardly to provide a lug 51 seated within a slot 62 formed in the lower end of the body section 41 (see Fig. 7). The lug 51 is provided with a threaded aperture to receive a connection screw 52. The upper end of the post 50 is provided with a hole 54 to receive a screw 53, which also passes through the lug 35 of the top screw shell 34, and into a threaded opening in the body section 41, for holding said shell in place. The lug 36 of the shell 34 is secured in place against the body section 42 by means of another screw 53.

The lower or outer ends of the body sections 41 and 42 are shaped so as to provide, when in assembled relation, an outwardly-extending, generally S-shaped divided supporting rib 61 having a central recess 62, allowing space for the connecting wiring (see Fig. 10).

A second electrical connection screw 63 is secured in an inwardly-extending end portion of a connector strip 64a seated within a recess running longitudinally along the lower end of the outside of the body section 42 (see Fig. 9). The electrical connector strip 64 is secured in place by an eyelet 65 extending into the side of said body section and connected to an electrical contact, the purpose of which is fully described hereinafter.

The body section 41 is formed with a large circular side opening 55 having an inner portion of increased diameter 56 (see Fig. 11). A small notch or indentation 57 is formed at one side of the increased diameter portion 56. Rotatably disposed within the opening 55 is a spring adjustment plug 58 carrying at its outer end a screw driver slot or kerf 59 in the form of an arrow (see Figs. 7 and 15). Also formed upon the outer end of the plug 58 is an arrow 60 indicating the turning direction of said plug after the assembly of the switch parts.

The plug 58 is provided at its inner end with an axial bore against the bottom of which is seated, when in assembled relation, one end of a large diameter coil spring 66. The plug 58 is further provided with a flared slot 67 and peripheral flange 67a operative to seat within the increased diameter portion 56 of the side opening 55 in the body section 41. The coil spring 66 is provided at its outer end with a radially outwardly-extending terminal 69, and at its inner end with a radially outwardly-extending terminal 70 adapted to be engaged in the slot 67 of the plug 58 in the manner hereinbelow described.

The switch actuating mechanism further comprises a circular ratchet plate 71 having four equidistantly spaced radially beveled teeth 72 (Fig. 11). One of the teeth 72 has an outwardly-extending integral arm 73 bent axially and formed in a circle at its outer end to provide an eyelet 74. The ratchet 71 is also formed with a central opening surrounded by a rim 75 for bearing purposes.

Cooperative with the ratchet 71 is a horizontal rotary shaft 76 of plastic or other electrical insulating material having a cylindrical end portion 77 of reduced diameter, upon which said ratchet is rotatably disposed in a bearing recess 58a of the spring adjustment plug 58. The rotary ratchet shaft 76 is also formed at its other end with a cylindrical portion of reduced diameter 78 having a cross-slot 79, said reduced portion 78 being rotatably disposed in a recess 84a of the body section 42, and also bears against the inner circular conformation of the inclined arcuate teeth 84. The central body portion of the ratchet shaft 76 is provided with a ratchet wheel 80 comprising four equidistantly spaced inclined tooth portions 80a, which are cooperative with the beveled teeth 72 on the ratchet 71.

A small diameter coil spring 81 is disposed within an axial bore 77a in the rotary ratchet shaft 76. The left-hand end of the spring 81 (see Fig. 11) has rotatably fitted therein a headed pin 82 having a cross groove 82a, within which the central portion of a cross-pin 83 is constrained to increase the spring pressure when the socket switch is assembled.

The cylindrical recess 84a of the body portion 42 is coaxial with the opening 55 in the body section 41, and in which the end 78 of the rotary ratchet shaft 76 is guided, when said body sections are assembled. The recess 84a is formed at its outer end with an increased diameter portion, within which are circularly formed four successive inclined arcuate teeth 84. The outside surfaces of the horizontally-opposed pair of the arcuate teeth 84 are covered with flat metal contacts 85, 85a having extending lug portions secured by respective eyelets 86 and 65 to the body section 42.

The eyelet 65, as previously described, connects with the connector strip 64 in which the terminal screw is threaded. The eyelet 86 also connects with an inwardly-turned lug of the side portion 40a of the center contact 40, establishing electrical connection between said center contact and the fixed contact 85a.

A U-shaped wire link 88 (Fig. 11) has a top arm 89 which is inserted in the eyelet 74 of the ratchet 71. The bottom arm 90 of the link 88 is connected with a vertical slide 91 by being engaged in a loop eye 92 formed in the face of said slide (see Figs. 5 and 11). The slide 91 is formed with an integral upwardly-extending and outwardly-inclined arm portion 93 of reduced width. The end of the arm portion 93 is bent outwardly to provide a narrow finger or trigger 94. The body sections 41 and 42 are formed with complementary vertical guide grooves or recesses 95, 96, within which the vertical edges of the slide 91 are disposed when the socket switch is in assembled condition, thereby limiting said slide to axial motion relative to the socket unit 32. The body section 41 is further formed, at its side opposite the guide groove 95, with a groove 97 adapted to receive and secure in place the side portion 40a of the center contact 40 (see Figs. 6 and 12). The finger or trigger 94 of the vertical slide 91 extends through the slot 15 in the socket shell 10 and projects into the annular rib 31 of the sleeve switch ring 28 surrounding said shell.

*Assembly*

Referring more in particular to Figs. 11 to 15 inclusive and also to Figs. 5 and 6, the inner socket switch unit is assembled by first placing the crosspin 83 in the recess 84a of the body section 42, in such a position that it rests across the bottom portions of the two inclined arcuate teeth 84 which are not covered by the flat metal contacts 85 and 85a (as best shown in Fig. 5).

The next step is to place the rotary ratchet shaft 76 in the recess 84a in such a manner that the cross slot 79 in its end 78 straddles the crosspin 83. The small diameter spring 81 is then slipped into the opening 77a in the ratchet shaft end 77, and a slight twist applied to its extended end (shown clearly in Fig. 12) to insure the engagement of groove 82a on the crosspin 83. The ratchet plate 71 is now slipped on the ratchet shaft end 77 along with the larger coil spring 66; the arm 73 of the ratchet plate being in alignment with the cross slot 79 and with the extended end 69 of the coil spring pressing against the eyelet portion 74 of the arm 73; the arm 73 will also be in contact with its stop 73a, as shown in Fig. 5. With the parts in this position, one side of the slide member 91 is inserted in the upper portion of the guide groove 96 in body section 42, and the U-shaped wire link 88 placed with its arm 89 engaging in the eyelet 74 of the ratchet plate arm 73, and with its arm 90 engaging in the loop eye 92 formed in the face of said slide member, as illustrated in Figs. 5 and 6, and the left-hand portion of Fig. 12. This completes the simple and unobstructed assembly of the main moving parts of my switch.

The next step of the assembly is to slip the spring adjustment plug 58 into the opening 55 of the body section 41, positioning the plug with the arrow head 59a of the screw driver slot 59 pointing toward the right as shown in Fig. 15. With the plug in this position, the flared slot 67 is in the correct position to easily engage the extended end 70 of the large coil spring 66, when both body sections 41 and 42 are brought together.

Fig. 13 shows the spring end 70 in said slot 67 with the other spring end 69 held in position by the arm 73 of the ratchet plate 71.

When the two body sections 41 and 42 are brought together, the alignment lugs 43 and 44, will have entered their respective holes 45 and 46, the bent down portion 40a of the center lamp bulb contact spring will have entered the groove 97, and the free side of the slide member 91 will be in the guide groove 95. A small amount of pressure must be exerted to hold the body sections in this position due to the coil springs 66 and 81 having been compressed slightly, until the clamping screw 48 can be inserted through the hole 47 (part 42), screwed into the tapped hole 49 (part 41) and tightened. The small coil spring 81 will be compressed by contacting the bottom of the recess 58a of the adjustment plug 58 (Fig. 6). The large coil spring 66 is compressed by reason of its extended end 70 bearing against the flat inner surface of the body section 41, since its length is such that it extends beyond the peripheral flange 67a, as shown in Fig. 13.

With the inner socket-switch thus assembled, a screw driver will be inserted in the slot 59 of the adjustment plug 58 and turned 180 degrees in a clockwise direction as indicated by the arrow 60, until the arrowhead 59a comes into alignment with the V-notch stop marker 59b, as illustrated in Fig. 7; thereby putting said spring 66 under torsional tension.

Also upon completion of the turning action, the spring 66 which is also under compression will cause the end 70 of said spring to enter into the notch or indentation 57 in the body section 41, as shown in Fig. 14. This automatically holds the spring 66 under tension, without the use of any securing means, and also prevents any further turning of the plug 58.

The peripheral flange 67a prevents the plug from being forced out of the body section 41 due to the pressure being put upon it by the compression of the two springs 66 and 81. The foregoing "wind-up" of the spring 66 is such that it normally exerts a clockwise turning force upon the ratchet plate 71, as can be best seen in Fig. 5; this turning motion being limited by the abutment of the ratchet plate arm 73 against the stop 73a formed on the body section 42.

With the body sections 41 and 42 assembled with their interior mechanism into what is called the inner switch unit 32, the electric bulb receiving screw shell 34 must be secured in position. This is accomplished by placing the shell on the switch unit in such relation that its central and side slots 37 and 39, respectively, are in the position shown in Fig. 2, in relation to the electric bulb spring contact element 40.

The bridging post 50 will then be placed in the longitudinal recess in the body section 41, which causes its upper apertured end to overlap the depending apertured lug 35 of the shell 34. One of the top screws 53 (right-hand side of Fig. 11) is then passed through the apertures in the bridging post lug 51 and screwed up tightly into a tapped hole (not shown) in the body section 41. The other top screw 53, shown at the left-hand side of Fig. 11, is then passed through the aperture in the depending lug 36 of the shell 34, and screwed up tightly in a tapped hole (not shown) in the body section 42. The inner switch unit 32 is now a complete operating electrical rotary switch, as illustrated in Figs. 7, 8, 9 and 10; the electrical strip 64 having been connected to the metallic contact 85 (left-hand side of Fig. 11) and the lug of the bent down side portion 40a of the bulb contact center spring element 40 having also been previously connected to the metallic contact 85a by their respective rivet eyelets 65 and 86 before the general assembly of said inner switch unit 32.

With the inner switch unit 32 ready for assembly with its cooperating shell 10 and its actuating sleeve switch ring 28, the lower cap 11 with its insulator disk 20 is placed on the double electrical conductor cord 27; the bared ends of which are secured around and under the heads of the terminal screws 52 and 63 of the bridging post 50 and the connector strip 64 respectively.

The assembly of the inner switch unit 32 with the outer shell 10 is as follows:

The insulation sleeve 18 is inserted within the shell 10 with its slot 19a in its enlarged section 19 in alignment with the slot 15 in the enlarged section of said shell 10, as shown in Fig. 5. The inner switch unit 32 is then pushed upward into the shell 10 and the insulation sleeve 18, in such a position that its extended finger or trigger 94 will be in line to enter the slots 19a and 15 of the insulation sleeve 18 and the shell 10, respectively. The finger or trigger 94 will readily enter the slot 19a, the length of which extends to the bottom ends of the sleeve 18, said edge extending beyond the lower end of said shell 10, as shown in Fig. 5. The upward movement of the inner switch unit 32 will be halted when the finger or trigger 94 contacts the bottom edge of the shell 10. Its length is governed by the total overall downward movement of the vertical slide member 91. At this point, the inclined arm 93 of the slide member 91, of which the finger or trigger 94 is an integral part, is sprung inward by means of any suitable tool until the outer end of said trigger 94 passes beyond the internal threaded portion 12 located at the lower edge of the shell 10 for the reception of the cap 11, and springs outward into the slot 15. When this takes place, the inner switch unit 32 is pushed upward into its operative position, as illustrated in Fig. 5, and the lower cap member 11 is moved up and screwed into position. The completion of this last operation causes the upturned rim 21 of the insulating disk 20 to press against the bottom edge of the insulation sleeve 18, and also hold the inner switch unit 32 firmly in position. This is due to the pressure brought to bear against the lower surface of the S-shaped divided supporting rib 61 (Fig. 10), the radius of the curved portions of the S-formation being such that they will just clear the inside diameter of the upturned rim 21 of the bottom insulating disk 20; said pressure being applied between the corner of the bottom insulating disk 20 and its upturned flange 21, and at the point where the inner beveled surface of the bottom cap 11 starts to taper inward. The ends of the conductor wires 27 have free passage under the supporting rib 61 by means of its central recess 62.

With the inner switch unit 32 secured in operative position within the shell 10, I will now describe a simple method for placing the sleeve switch ring 28 in the position illustrated in Fig. 5. Thus, the sleeve switch ring 28 will be slipped downward over the top reduced threaded portion 16 of the shell 10 past the rib 17 (as shown in dot and dash lines) until the outwardly flared lip 30 contacts the outer end of the trigger 94. Sufficient downward pressure is then manually applied to the sleeve switch ring 28 to cause the flared lip 30 to force the inclined arm 93 of the vertical slide member 91 inward enough to clear the inner circular circumference of said flared surface. The trigger 94 will then snap outward again and stay in that position until engaged by the 45 degree upper surface of the large annular finger control rib 29. The contact of the outer edge of the trigger with this tapered surface will again force it inwardly until the edge of the trigger 94 passes beyond the lower wall 31a of the small rib 31; which it will enter and be prevented from passing beyond, due to the right angle wall surface 31b of said small rib 31, as shown in Fig. 5. To remove the sleeve switch ring 28, it will be pulled upward sharply, and the trigger 94 will be forced inward by the beveled or tapered surfaces of the sleeve switch ring 28 until said switch ring is clear of its lower outwardly flared lip 30.

To disassemble the complete socket switch assembly, the above described steps will be reversed.

Operation

In the rest or "off" position, as shown in Fig. 5, the circular ratchet plate 71 will be constrained by the spring 66 into abutting relation with respect to the stop 73a, thus holding the U-shaped link 88, the vertical slide member 91, and the sleeve switch ring 28 in their uppermost positions.

At this time, the crosspin 83 bridges the bottoms of the vertically opposed arcuate teeth 84 formed in the insulating body section 42, making no connection between the metal contacts 85 and 85a and thus failing to energize the electric bulb center contact 40. Upon manually pushing the sleeve switch ring 28 down, the ratchet plate 71 being pulled around by the link 88 through the vertical sliding action of the slide member 91, will engage the ratchet teeth 80a of the rotary shaft 76, turning it, together with the crosspin 83 through an angle slightly greater than 90 degrees, so that said crosspin will ride over the inclines of the insulating arcuate teeth 84, under the resilient axial compressional force of the spring 81, and finally move horizontally to a position where it makes electrical connection between the metal contacts 85 and 85a, thereby energizing the center contact 40 and turning the switch "on."

Upon release of the downward push of the switch ring 28, the torsional force of the spring 66 will return the ratchet 71 to its starting position, without moving the crosspin 83, and the switch will be ready for the "switching off" action, accomplished upon the next pushing down of said switch ring 28, to restore said crosspin to the non-contacting position shown in Fig. 5.

It is to be noted that the vertical ribs 14 of the socket shell 10 serve not only to minimize sliding friction between the switch ring 28 and said shell, but also allow a circulation of air for cooling. It is also to be noted that as the switch ring 28 descends, during switching action, the upper end of the link 88 gradually moves outwardly so that the link becomes more nearly in alignment with the vertical slide 91, thereby insuring smooth and forceful action in turning the ratchet 71 against the return force of the spring 66.

Modified form

The modified form of switch socket illustrated in Figs. 16, 17 and 18 differs principally from the first form in that the inner switch unit 100 has its circular switching ratchet plate 101 mounted for rotation in a horizontal plane and on a vertical axis rather than in a vertical plane and horizontal axis as in the first embodiment, described above. Since switching sockets with horizontally mounted actuating mechanisms are commonly used in pull chain type socket switches, and are of well known construction, the ratchet switching mechanism forming part of the inner unit 100 will not be described in detail herein.

As seen in Figs. 17 and 18, an extended arm 102 of the circular switching ratchet plate 101 is formed with a slot within which the knotted end 103 of a pull cord 104 is secured. The other end of the pull cord 104 passes through an eyelet 105 fixed in the body of the inner unit 100 and is knotted as indicated at 106 to hook within a slot provided in the lower edge of a finger 107 projecting inwardly through the slot 15 in the socket shell 10.

The lug 107 is provided with an integral arcuate spring arm 108 having its outer end secured, as by a rivet 109, to an annular rib 110 of a sleeve switch ring 111. It will be apparent that upon pushing the switch ring 111 downwardly, the cord 104, guided by the eyelet 105, will pull the circular switching ratchet plate 101 clockwise (Fig. 18) to effect switching.

Operation of modified form

When the inner switch unit 100 is assembled, as shown in Fig. 17, it is moved upwardly into the socket shell 10 with the insulation sleeve 18 in position, and with its conductor wire lead-in ends 27 attached to their respective terminals. The upper ends of the sleeve switch ring 111 will then be slipped over the lower end of the shell 10 until the inwardly projecting finger 107 of the arcuate spring 108 abuts against the bottom edge of said shell 10. A suitable instrument will then be inserted inside the lower end of the sleeve switch ring 111 to force the inner end of the finger 107 outward against the pressure of the arcuate spring 108 to cause said finger to slide along the outer surface of the socket shell as illustrated in Fig. 17 by dot and dash lines. With the finger 107 in this position, the sleeve switch ring 111 will be moved upward with the finger 107 in alignment with the slot 15 in the shell 10, until said finger slips into said slot. With the sleeve switch ring 111 remaining in its lowermost position (not shown) and with the finger 107 resting against the bottom of the slot 15, the inner switch unit 100 will then be lowered to allow the knot 106 of the free end of the cord 104 to be easily hooked in the notch in the end of the finger 107 as shown in Fig. 17. With the parts thus connected, the inner switch unit 100 will be pushed upward into the position shown in Fig. 17, thus carrying the sleeve switch ring 111 with it. The lower cap 11 with its insulating disk 20 having been previously strung on the double conductor lead wire 27, it will then be screwed into the bottom of the socket sleeve; thereby securely holding all the parts in their operative positions as shown.

It will be understood that while my invention is illustrated and described herein as embodied in a lamp socket for a single filament lamp, it is also applicable for use with a "three-way" lamp providing various amounts of illumination.

It is further to be understood that this disclosure is for the purpose of illustration only, and in that various omissions, or changes in arrangement of parts, as well as the substitution of equivalent elements for those herein shown and described, can be made, without departing from the spirit and scope of the invention as defined in the following claims.

Having thus fully described the invention, what is claimed as new and for which it is desired to secure Letters Patent is:

1. In an electrical switch, the combination comprising a body member, cyclically operative switching means contained in said body member, a sleeve member surrounding said body member, and means interconnecting said switch means and said sleeve member operative to actuate said switch means upon axial sliding movement of the entire sleeve member with respect to said body member.

2. The electrical switch as defined in claim 1, wherein said switching means comprises a rotary ratchet switch.

3. The electrical switch as defined in claim 2, wherein said interconnecting means comprises a rigid link articulated between said rotary ratchet switch and said sleeve member.

4. The electrical switch as defined in claim 2, wherein said rotary ratchet switch is disposed for rotation in a plane parallel to the direction of axial movement of said sleeve member, and wherein said interconnecting means comprises a rigid link articulated between said rotary ratchet switch and said sleeve member.

5. The electrical switch as defined in claim 2, wherein said interconnecting means comprises a flexible cord connected between said rotary ratchet switch and said sleeve member.

6. The electrical switch as defined in claim 2, wherein said rotary ratchet switch is disposed for rotation in a plane transverse to the direction of axial movement of said sleeve member, and wherein said interconnecting means comprises a flexible cord connected between said rotary ratchet switch and said sleeve member.

7. In an electrical switch, the combination comprising a cylindrical body member, a rotary ratchet switch contained in said body member, said ratchet switch having an actuating arm revolvable about a central axis for controlling switching action, a cylindrical housing shell removably fitted on said body member, a longitudinal slot in said housing member, a sleeve member surrounding said housing shell, and means interconnecting said actuating arm and said sleeve member and extending through said slot for revolving said actuating arm upon axial movement of said sleeve member with respect to said body member.

8. The electrical switch as defined in claim 7, wherein the central axis of said actuating arm extends transversely to the axis of symmetry of said cylindrical body member and wherein said interconnecting means comprises a rigid link articulated between said actuating arm and said sleeve member.

9. The electrical switch as defined in claim 7, wherein the central axis of said actuating arm extends parallel with respect to the axis of symmetry of said cylindrical body member and wherein said interconnecting means comprises a flexible cord connected between said actuating arm and said sleeve member.

10. The electrical switch as defined in claim 7, including a lamp base screw sleeve fixed at one end of said body member, a central contact member disposed at the base of said screw sleeve, and means connecting said contact member in series electrically with said ratchet switch.

11. The electrical switch as defined in claim 7, including a plurailty of longitudinal ribs formed about the outer surface of said housing shell whereby sliding friction between said shell and said sleeve upon actuation of the switch is minimized.

12. The electrical switch as defined in claim 8, wherein said interconnecting means further comprises a slide member constrained to axial movement in grooves within said body member, said slide having a finger or trigger portion extending resiliently through the slot in said housing shell, and wherein said sleeve member is formed with an annular outwardly projecting rib defining an annular space within which said finger or trigger portion extends.

13. The electrical switch as defined in claim 12, wherein said sleeve is formed at one end with an outwardly-flared lip facilitating assembly of said sleeve.

14. The electrical switch as defined in claim 13, wherein said sleeve member is formed with a second outwardly-projecting rib of greater size than said first mentioned rib to provide a finger grip for switch actuation.

15. In an electrical switch, the combination comprising a cylindrical body member, said body member comprising two semi-cylindrical body sections, a rotary ratchet switch contained in said body members and having a radial actuating arm revolvable about a central axis for controlling switching action, a torsion spring within said body member, said torsion spring having one end operative against said actuating arm for normally holding said ratchet switch at a first rotary position, means adjustably positioned in one of said body sections and cooperative with the other end of said spring for winding up said spring to exert a torsional force against said actuating arm, a cylindrical housing shell removably fitted on said body member, said shell having a longitudinal slot, a sleeve member surrounding said housing shell, and means interconnecting said sleeve member and extending through said slot for revolving said actuating arm against the torsional force of said spring upon axial movement of said sleeve member with respect to said body member.

16. The electrical switch as defined in claim 15, including a lamp base screw fixed at one end of said body member, a central contact member disposed at the base of said screw sleeve, and means connecting said contact member in series electrically with said ratchet switch.

17. The electrical switch as defined in claim 15, wherein said interconnecting means comprises a slide member constrained to axial movement in complementary grooves formed one each in said body sections, said slide having an ear portion extending resiliently through the slot in said housing shell, a rigid link articulated between said actuating arm and said slide member, said sleeve member being formed with an outwardly projecting rib defining an annular space within which said ear portion extends.

18. The electrical switch as defined in claim 15, wherein said adjustably positioned winding means comprises a cylindrical plug having a radial slot, said slot being operative to engage the other end of said spring for winding said spring upon axial turning of said plug.

19. The electrical switch as defined in claim 18, in which one body section has a slot in alignment with the radial slot in said plug at the adjusted position of said plug for receiving and locking in place said other end of said spring, said spring being arranged under compression between said body sections.

References Cited in the file of this patent

UNITED STATES PATENTS

| | | |
|---|---|---|
| 1,581,785 | Cassidy | Apr. 20, 1926 |
| 1,996,029 | Popp | Mar. 26, 1935 |
| 2,114,826 | Zelov | Apr. 19, 1938 |
| 2,146,011 | Dame | Feb. 7, 1939 |
| 2,453,694 | Arntzen | Nov. 16, 1948 |